United States Patent Office 3,471,359
Patented Oct. 7, 1969

3,471,359
PARTIALLY CROSS-LINKED POLYETHYL-ENIMINE ANCHORING AGENT AND LAMINATE THEREFOR
Albert Goldstein, New Shrewsbury, N.J., assignor to Chemirad Corporation, East Brunswick, N.J., a corporation of Delaware
No Drawing. Filed Aug. 2, 1965, Ser. No. 476,705
Int. Cl. B32b 31/04; C09j 3/04
U.S. Cl. 161—227                                4 Claims

ABSTRACT OF THE DISCLOSURE

An anchoring agent comprising polyethylenimine cross-linked to a degree of from about one-half to three-quarters of its NH groups with tris-(1-aziridinyl) phosphine oxide or vinylcyclohexene dioxide and a laminate comprising a layer of polyethylene terephthalate and a layer of polyethylene bonded together by said anchoring agent.

---

This invention relates to anchor coating of substrates for provision of improved laminates or bonded composites, especially of smooth, difficultly bondable materials, particularly of dissimilar composition.

There are many instances in which it has proved difficult to bond one material to another, especially where at least one of the materials is smooth and relatively inert chemically. The occasion often arises when it is desired to cover a substrate with a solid film having dissimilar properties. The difficulty of the situation is sometimes aggravated by flexibility of the substrate, which itself may be in film form or in other form subject to deformation, such as filamentary, tubelike, or cellular, and possibly elastomeric as well, in which event the product is especially susceptible to subsequent delamination or failure of the bond. Moisture is also often deleterious to the bond, as many adhesives and bonding agents are moisture-susceptible.

A primary object of the present invention is provision of composite or laminated articles through the use of an improved anchoring technique.

Another object is moisture-resistant bonding of films to substrates, either or both of which are smooth and relatively inert chemically.

A further object is provision of anchoring agents having novel solubility characteristics.

Other objects of this invention, together with means and methods for attaining the various objects, will be apparent from the following description, which is exemplary rather than limitative.

In general, the objects of the present invention are accomplished by means of polyalkylenimines cross-linked to a partial or only minor extent, soluble in water or lower alkanol (or mixture thereof) upon preparation and insoluble therein after removal of the solvent. Thus, selected polyalkylenimine dissolved in such a solvent is mixed, and thereupon reacted with, a considerably less than equimolar quantity of selected cross-linking agent dissolved in such solvent; the resulting solution of partially cross-linked polyalkylenimine reaction product is applied to the substrate in suitable manner to coat it, preferably just barely; and then the solvent is removed to leave a solid coating of the reaction product on the substrate. Selected film is applied thereover and bonded thereto in appropriate manner to produce the composite or laminated product.

Polyalkylenimines suited to the practice of this invention include homopolymers of ethylene imine, propylene imine, and butylene imine, and copolymers or interpolymers thereof with one another. Such suitable polymers may be formed by conventional polymerization procedures well known in the art and are articles of commerce that may be purchased already polymerized. Suitable degrees of polymerization are difficult to specify absolutely, although they can be determined relatively readily enough in terms of solubility and viscosity by persons skilled in the art. For example, polyethylenimine having a kinematic viscosity of one centipoise when measured as a one percent aqueous solution at 20° C. is suitable and for convenience is meant whenever the abbreviation PEI is used hereinafter.

Suitable solvents for the polymer, both before and after the specified partial or minor degree of cross-linking, include methanol, ethanol, and isopropanol as examples of lower alkanols useful instead of or in addition to water. The cross-linking agent preferably is supplied dissolved therein also but may be added directly to the polymer solution if desired. Such solutions may be acidified, as by inclusion of a small amount of hydrochloric acid, or may include other ingredients.

Suitable cross-linking agents for the polyalkylenimine include polyfunctional compounds, such as polyhalohydrins, polyisocyanates, polyepoxides, and polyaziridinyl compounds (e.g., epichlorohydrin, hexamethylene diisocyanate, polyvinylcyclohexene dioxide, tris-(1-aziridinyl) phosphine oxide); unsaturated carboxylic acids and their reactive derivatives, such as chlorides and esters (e.g., acrylic acid, acrylochloride, acrylates); and lower aliphatic ketones and aldehydes, saturated and unsaturated (e.g., acetone, acetaldehyde, acrolein). The cross-linking agent is used in considerably less than equivalent quantity (or stoichiometric ratio with respect to the component alkylenimine mer) to leave at least one-fourth, and preferably one-half or somewhat more of the NH groups in the polymer unreacted. Thus, for each gram of PEI, which is characterized by a "molecular" weight of 43 for the mer unit which is $CH_2CH_2NH$, an amount of half a gram of acetaldehyde (mol. wt. 44) would leave, upon complete reaction, about one-half of the NH groups unreacted. If desired, an excess of unreacted polyalkylenimine may be added to the solution of partially cross-linked polymeric reaction product to increase the overall average frequency of unreacted NH groups.

The dissolved reaction product, partially crosslinked polyalkylenimine, is applied to the substrate in a thin coating by any appropriate technique, such as immersion or spraying, and the solvent is then removed, most often by evaporation, with or without the aid of heating. The resulting solid layer of partially cross-linked polyalkylenimine, which preferably barely covers the substrate surface, is sorbed securely thereto by imperfectly understood forces. The film to be bonded thereto is applied thereover in suitable manner, as from a melt or a solution thereof, or as a solid with or without the use of intervening adhesive of pressure-sensitive or other appropriate type. The resulting composite or laminated structure, which if desired may comprise a plurality of layers of the substrate or the applied film (or both), is generally found, regardless of method and materials, to be more securely bonded together than in the absence of the anchoring coating of this invention. Furthermore, so long as none of the other components employed is moisture-sensitive, i.e., susceptible to debonding in the presence of water or lower alkanol, the bond is largerly insensitive thereto despite the fact that the anchoring agent was prepared in a solution thereof and was applied in the form of such solution. Resistance to delamination upon exposure to water or lower alkanol above room temperature and even at boiling temperature thereof is notable in the composite or laminated products of this invention.

Composition suitable for either (or both) the substrate or the foil to be applied thereto include linear organic polymers, cellulosic (including cellulose derivatives), such as paper, cardboard, and hardboard, and noncellulosic, such as polyamide (e.g., 6, 66, and other nylons and their copolymers or interpolymers), polyester (e.g., polyethylene terephthalate), and polyolefin (e.g., polyethylene, polypropylene); three-dimensional elastomeric polymers, such as acrylonitrile-butadiene-styrene rubbers, and cellular or foamed elastomer (e.g., polyurethane); metals and their alloys (e.g., aluminum, copper, steel); and glass and ceramics. Although for convenience one of the materials to be bonded is considered the substrate, it is apparent that in many instances it will be in foil form and that the other foil material may be considered the substrate instead, whereupon the partially cross-linked polyalkylenimine of this invention may be deposited on either (or, in some instances, on both) of the materials, before joining them.

In the following examples, all concentrations and parts are stated by weight unless otherwise indicated.

Example 1

A solution was made up of 10 parts 50% aqueous solution of PEI and 90 parts isopropanol. To this was added 0.6 part tris-(1-aziridinyl) phosphine oxide as 85% solution in methanol. The resulting solution was coated on four glass strips (microscope slides), two of which were dried at about 25° C., while the other two were dried in an oven at 40° C. After 2 days under such conditions one of each was immersed in deionized water at room temperature, whereupon the coatings exhibited only slight swelling and when scraped off in the form of flakes remains insoluble in the water. The coatings remained hard, continuous, and transparent on the slides not immersed in the water.

Example 2

An aqueous solution having a solids concentration of 2% was made up from 10 parts 50% aqueous PEI and 0.6 part tris-(1-aziridinyl) phosphine oxide, hereinafter referred to as APO. This solution was coated onto a polyethylene terephthalate film (Mylar brand, manufactured by E. I. du Pont de Nemours & Co.) and the excess removed by squeegee. After drying, the coated film was juxtaposed to a solid film of polyethylene with the coating of modified PEI anchoring agent therebetween, and the two films were bonded together at conventional laminating pressure and temperature. The resulting structure was immersed in water at room temperature for three weeks, after which the bond was still strong, whereas a similar control structure differing only in that the anchoring coating was made in like maner of unmodified PEI (i.e., lacking the APO) failed within one week of immersion in water at room temperature.

Example 3

A series of eight solutions was prepared by addition of each of the following compounds in the indicated quantities (two different concentrations of each) to separate samples of 10 parts 50% aqueous PEI in 90 parts isopropanol:

(a) APO, (1) 0.3 part, (2) 1.2 part;
(b) vinylcyclohexene dioxide, (1) 0.5 part, (2) 1.0 part;
(c) epichlorohydrin, (1) 0.5 part, (2) 1.0 part;
(d) alpha-dichlorohydrin, (1) 0.5 part, (2), 1.0 part;

These solutions were coated on glass slides, which were dried at room temperature, while a second set of identically coated slides was oven-dried for 3 hours at 90° C. In each case a control slide was prepared employing unmodified PEI. All the sample coatings were insoluble in water, and all the control coatings were water-soluble.

Example 4

One part PEI was added to 3 parts of the reaction product of equivalent amounts of PEI and epichlorohydrin in isopropanol. The resulting solution was applied by gravure roll to polyethylene terephthalate film (Du Pont Mylar) and dried thereon. Polyethylene film was applied thereto, and the resulting bond, when tested in boiling water for 30 minutes, remained intact.

Example 5

The procedure of Example 4 was repeated using an isopropanol solution of 0.25% PEI and 0.0125% of the PEI-epichlorohydrin reaction product. The film of polyethylene terephthalate was 50 to 75 gage, and the thickness of the polyethylene film was 10 mills. Soaking of the bonded composite article in water and isopropanol for 3 weeks resulted in no breakdown of the bond.

The claimed invention:
1. An anchoring agent, resistant to moisture, comprising polyethylenimine cross-linked to a degree of from about one-half to three-quarters of its NH groups with tris-(1-aziridinyl) phosphine oxide.

2. An anchoring agent, resistant to moisture, comprising polyethylenimine cross-linked to a degree of from about one-half to three-quarters of its NH groups with vinylcyclohexene dioxide.

3. A laminate comprising a first layer of polyethylene terephthalate and a second layer of polyethylene, said layers bonded by an agent comprising polyethylenimine cross-linked to a degree of from about one-half to three-quarters of its NH groups with tris-(1-aziridinyl) phosphine oxide.

4. A laminate comprising a first layer of polyethylene terephthalate and a second layer of polyethylene, said layers bonded by an agent comprising polyethylenimine cross-linked to a degree of from about one-half to three-quarters of its NH groups with vinylcyclohexene dioxide.

References Cited

UNITED STATES PATENTS

| | | | |
|---|---|---|---|
| 2,828,237 | 3/1958 | Rosser | 156—331 |
| 3,140,196 | 7/1964 | Lacy et al. | 156—331 |
| 3,230,135 | 1/1966 | Hurst | 161—227 |
| 3,264,368 | 8/1966 | Lane et al. | |
| 3,270,005 | 8/1966 | Ingram. | |
| 3,290,416 | 12/1966 | Christenson et al. | |
| 3,291,775 | 12/1966 | Holm. | |
| 3,325,346 | 6/1967 | Osborg. | |
| 3,332,841 | 7/1967 | Ainsworth et al. | |
| 3,354,103 | 11/1967 | White. | |
| 3,373,194 | 3/1968 | Fuhrmann et al. | |

ROBERT F. BURNETT, Primary Examiner

W. J. VAN BALEN, Assistant Examiner

U.S. Cl. X.R.

117—72, 75, 76; 156—331; 161—231, 247; 260—2, 77.5